(12) United States Patent
Woo

(10) Patent No.: US 10,991,188 B2
(45) Date of Patent: Apr. 27, 2021

(54) USING A VEHICLE TO PROVIDE HOME SECURITY

(71) Applicant: Ford Global Technologies, LLC, Dearborn, MI (US)

(72) Inventor: Jason Woo, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 16/589,845

(22) Filed: Oct. 1, 2019

(65) Prior Publication Data

US 2021/0097788 A1 Apr. 1, 2021

(51) Int. Cl.
*G07C 9/28* (2020.01)
*H04N 5/247* (2006.01)
*H04W 4/021* (2018.01)

(52) U.S. Cl.
CPC .............. *G07C 9/28* (2020.01); *H04N 5/247* (2013.01); *H04W 4/021* (2013.01)

(58) Field of Classification Search
CPC .......... G07C 9/28; H04N 5/247; H04W 4/021
See application file for complete search history.

(56) References Cited

U.S. PATENT DOCUMENTS

| 6,956,478 B2 | 10/2005 | Oyagi et al. |
| 10,155,500 B2 | 12/2018 | Cogill et al. |
| 2003/0151501 A1* | 8/2003 | Teckchandani ......... B60R 25/33 340/426.19 |
| 2005/0128068 A1* | 6/2005 | Winick ................ B60R 25/102 340/517 |
| 2013/0256396 A1* | 10/2013 | Rogers ................... G06Q 50/10 235/375 |
| 2016/0364979 A1* | 12/2016 | Warren .................. G08C 17/02 |
| 2017/0080898 A1* | 3/2017 | Cogill ................. B60R 25/102 |
| 2020/0023862 A1* | 1/2020 | Rodriguez Bravo ... B60R 25/24 |

FOREIGN PATENT DOCUMENTS

| JP | 2007072686 A | 3/2007 |
| JP | 2011232877 A | 11/2011 |
| JP | 2016139865 A | 8/2016 |

* cited by examiner

*Primary Examiner* — Sisay Yacob
(74) *Attorney, Agent, or Firm* — Brandon Hicks; Eversheds Sutherland (US) LLP

(57) ABSTRACT

Exemplary embodiments described in this disclosure are generally directed to using a vehicle to provide building security. In one exemplary embodiment, a computer that is provided in a vehicle is communicatively coupled to various sensors included in an anti-theft security system of the vehicle. The computer automatically activates a building security procedure upon determining that the vehicle has entered, or is located inside, a geofence of a residence. The sensors are configured to detect a security event that may take place near the residence. For example, a motion sensor may be used to detect a burglar approaching the residence or a sound detector may be used to detect shattering of a glass window of the residence. Upon detecting such a security event, the anti-theft security system of the vehicle may transmit a security alert to an individual and/or a monitoring service.

16 Claims, 6 Drawing Sheets

USING A VEHICLE TO PROVIDE HOME SECURITY

FIELD OF THE DISCLOSURE

This disclosure generally relates to a vehicle, and more particularly relates to using a vehicle to provide home security.

BACKGROUND

Most vehicles now include anti-theft systems to protect against break-ins and theft. A typical vehicle anti-theft system can include various types of devices such as sensors for detecting a break-in attempt, alarms for discouraging the break-in, and a communication system to report the break-in attempt to a driver of the vehicle. A vehicle may include, for example, a door sensor for detecting an attempt to open a locked door, a glass-break sensor for detecting a window being broken into, and a pressure sensor for detecting an object making unexpected contact with the vehicle. While such sensors can detect actions carried out upon the vehicle, other types of devices may be used to operate as a deterrence to an individual approaching a vehicle with malicious intent even before the individual makes contact with the vehicle. For example, a sonar or a radar device may be used to detect a person coming too close to a vehicle and to transmit a signal to a horn of the vehicle for sounding a warning beep.

In view of the prevalence of anti-theft systems in vehicles, most car buyers typically consider an anti-theft system to be an integral part of a vehicle and may not be offered an option to exclude purchase of the anti-theft system. On the other hand, many home owners and renters would consider installing a residential security system as a personal choice and may opt to forgo installing one due to various reasons such as installation cost and monitoring fees. However, a residence and the contents of a residence may, in many cases, be equally valuable, or even more valuable, than a vehicle or the contents of a vehicle. It is therefore desirable to provide solutions that can offer home security in a cost-effective manner.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
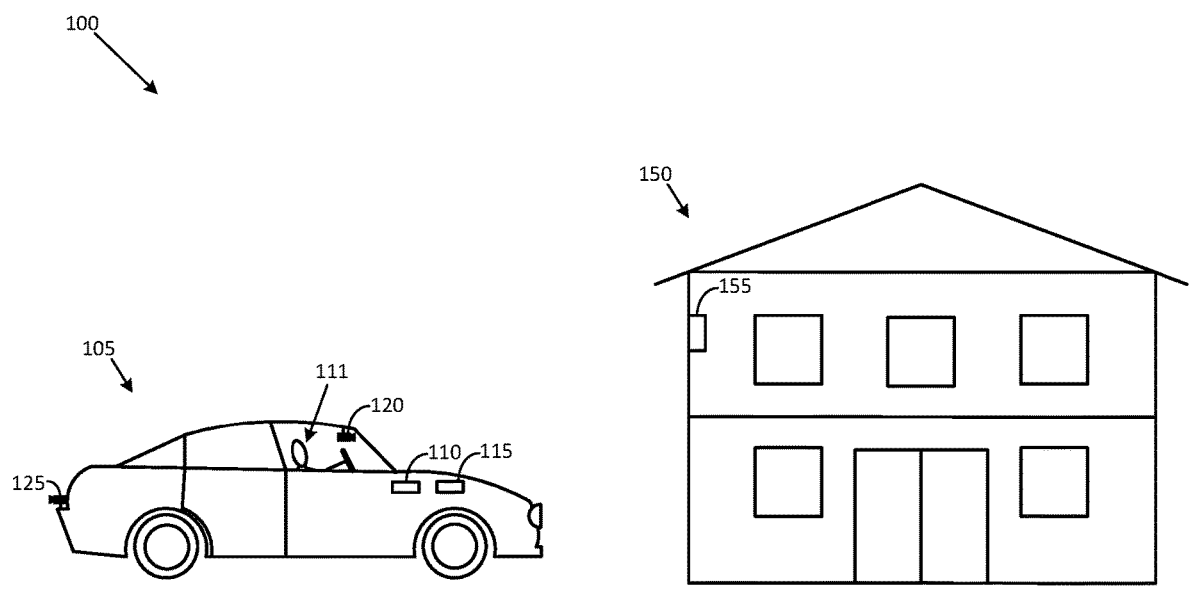
FIG. 1 shows an exemplary embodiment of a system for using a vehicle to provide home security in accordance with the disclosure.

In terms of a general overview, certain embodiments described in this disclosure are generally directed to systems and methods for using a vehicle to provide security to a building. In an exemplary implementation, a computer that is provided in a vehicle is communicatively coupled to various sensors that may be included in an anti-theft security system of the vehicle. The computer automatically activates a building security procedure upon determining that the vehicle has entered a geofence of a building, or is located inside the geofence. The building can be a residence of an individual or any other type of building, and the geofence may be designated to encompass the entire building or a portion of the building (a front portion, for example). The sensors are configured to detect any security event that may take place in the vicinity of the residence. For example, a motion sensor that is a part of the anti-theft security system of the vehicle may be used to detect a burglar approaching the residence, or a sound detector (such as a microphone) that is a part of the anti-theft security system of the vehicle may be used to detect shattering of a glass window of the residence. Upon detecting such a security event, the anti-theft security system of the vehicle may transmit a security alert to a recipient entity such as an individual who resides in the residence or a monitoring service.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "building" and the word "residence" may be used interchangeably in various instances in this disclosure. It must be understood that the use of either word encompasses structures such as a house, a home, an office, or a commercial establishment (a store, a manufacturing facility, a warehouse, etc.). The word "vehicle" as used herein encompasses various types of vehicles such as cars, trucks, vans, and sports utility vehicles (SUVs), and also encompasses various types of automobiles such as a boat, a tractor, or a recreational vehicle (RV) that may house an anti-theft system. The phrase "anti-theft system," which may be alternatively referred to in the disclosure as a "vehicle security system," as used herein refers to any system that is used to protect a vehicle from being damaged, stolen, or broken into. Words such as "wireless" or "wirelessly" as used herein are not intended to preclude other forms of communication such as optical communications and wired communications. The examples provided herein encompass such alternative communication technologies. Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 shows a first exemplary embodiment of a system 100 for using a vehicle 105 to provide home security to a building 150 in accordance with the disclosure. The vehicle 105 may be any of various types of vehicles such as a gasoline powered vehicle, an electric vehicle, a hybrid electric vehicle, or an autonomous vehicle, and may include components such as a vehicle systems controller 115, a vehicle security computer 110, and various elements such as sensors, alarms (a car horn or a siren, for example), and communication devices (a wireless radio transmitter, for example) that are communicatively coupled to the vehicle security computer 110 and/or the vehicle systems controller 115.

The vehicle systems controller 115 may perform various functions of the vehicle 105 such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

The vehicle security computer 110 may execute various functions associated with protecting the vehicle 105 against theft, break-ins, or other malicious activities. For example, the vehicle security computer 110 may detect the depression of a door lock button or a security arm button, in a key fob, by a driver 111 of the vehicle 105, after the driver 111 has exited the vehicle 105. Upon detecting such an action, the vehicle security computer 110 may execute an arming action for protecting the vehicle 105. The vehicle security computer 110 may receive a signal from a sensor (such as a door sensor) if a break-in attempt were to take place subsequently. The vehicle security computer 110 may respond to the signal by carrying out operations such as sounding an alarm and/or sending out an alert to the driver 111 of the vehicle 105 to inform the driver 111 of the break-in attempt.

In an exemplary case, the vehicle security computer 110 may receive a signal from the vehicle systems controller 115 that the vehicle 105 is in a parked condition, and that it is permissible for the vehicle security computer 110 to carry out an arming action to protect the vehicle 105.

In accordance with various embodiments of the disclosure, the vehicle security computer 110 may be configured to not only provide protection to the vehicle 105 but may be further configured to provide security measures to protect the building 150 from various types of malicious activities such as, for example, a burglar attempting to break into the building 150 or a miscreant trespassing on a property near the building 150.

The building 150 may be a residence, a house, an office, or a commercial establishment such as a store, a manufacturing facility, or a warehouse that is owned by an individual associated with the vehicle 105. In some cases, the building 150 may be a place where an individual resides temporarily, such as, for example, a motel in which the individual is staying overnight. In the illustrated exemplary embodiment, the building 150 is a residence having a home security system 155. The home security system 155 may include various sensors and detectors for detecting security events such as a break-in, a burglary, or other such malicious activities. The home security system 155 may also include a siren that is sounded when the home security system 155 detects a security breach and an auto-dialer that sends out a signal alert to a monitoring service about the security breach. The monitoring service may be located at a remote location, sometimes in a different city.

The home security system 155 may offer a certain level of protection against certain types of malicious activities that can occur inside the residence or upon structural elements of the residence (such as a window, a door, or a wall). Some exemplary malicious activities can include a break-in that may take place through a door or a window of the residence, or a burglar moving around inside the residence. However, as may be typical of many home security systems, the home security system 155 may not have the capability to detect security events that take place outside the residence. For example, the home security system 155 may not be configured to detect a burglar jumping over a fence in a backyard of the residence or an intruder sneaking up a driveway of the residence.

Adding security devices such as floodlights, motion detectors, and cameras outside the residence in order to monitor an exterior area of the residence may be expensive in some cases and may also be susceptible to false alarms in some cases (such as triggering of a motion detector by a stray animal or by an automobile driving past the residence on a public road). Home owners and renters may therefore tend to avoid installing a security system outside the residence even though it may be desirable to do so for the sake of security.

Consequently, in accordance with the disclosure, the vehicle 105, which typically includes the vehicle security computer 110 and associated equipment (sensors, alarms, etc.), can be used to provide various security measures to protect against security threats that may occur outside the building 150. In one exemplary application where the vehicle 105 is parked outside the building 150 (on a driveway, for example), a motion sensor in the vehicle 105 may be configured to detect an intruder approaching the building 150 and to send a signal to the vehicle security computer 110 to inform the vehicle security computer 110 of the intrusion. In an exemplary scenario, the vehicle security computer 110 may confirm the detection by activating an image capture system 120 (and/or an image capture system 125) to capture an image of the intruder. The captured image may be processed by the vehicle security computer 110 to determine that the intruder represents a security threat. The vehicle security computer 110 may then use a communication system in the vehicle 105 to transmit a security alert to a recipient entity such as a resident inside the building 150 or a monitoring service located elsewhere.

In another exemplary application, where the vehicle 105 is parked outside the building 150 or inside a garage of the building 150, a glass breaking sensor in the vehicle 105 may detect the sound of breaking glass when a burglar attempts to enter the building 150 through a window, for example. A signal may be sent from the glass breaking sensor to the vehicle security computer 110 to allow the vehicle security computer 110 to verify whether the sound is indicative of a security threat. The communication system in the vehicle 105 may transmit a security alert to a resident inside the building 150 and/or to a monitoring service elsewhere if the security threat is confirmed.

Figure 2:
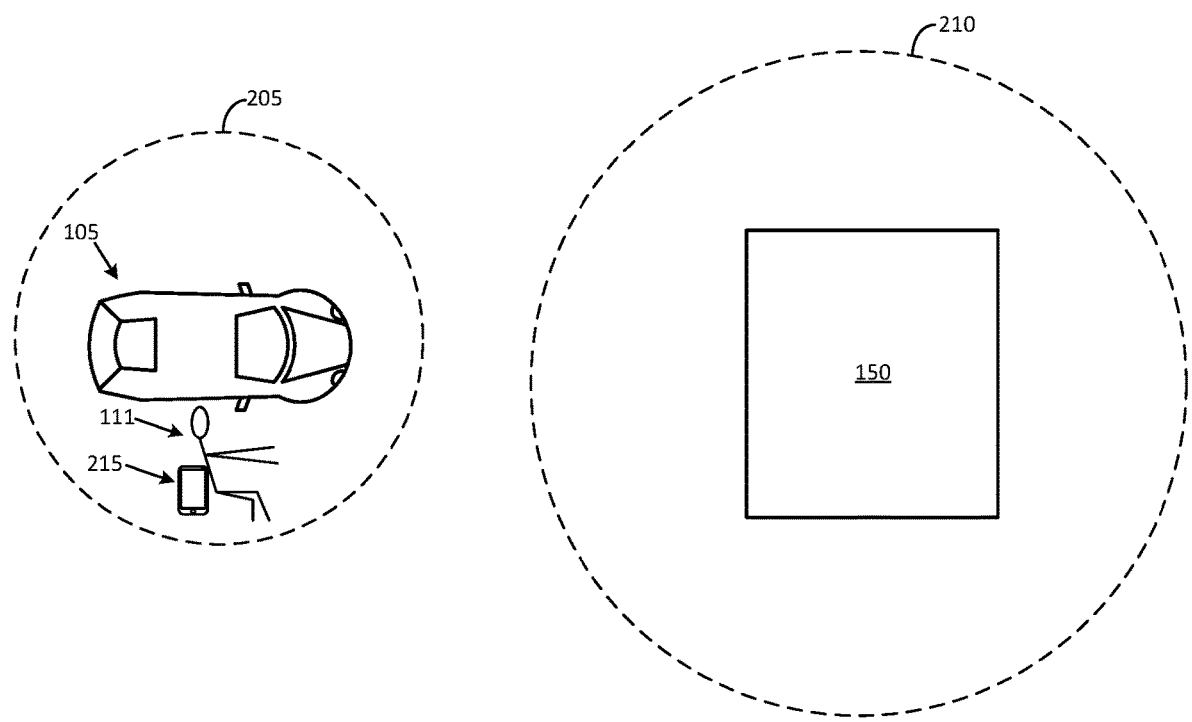
FIG. 2 illustrates a first exemplary geofence that may be used by a vehicle to provide home security in accordance with the disclosure.

FIG. 2 illustrates a first exemplary geofence 210 that may be provided around the building 150 in accordance with the disclosure. The geofence 210 may be used to configure the vehicle 105 to detect and provide warning of security events occurring outside the building 150. In this exemplary implementation, the geofence 210 has a circular profile that encompasses an entirety of the building 150. The building 150 may include a garage in some cases. In another implementation, the geofence 210 may have a profile other than a circular profile. For example, the geofence 210 may have an irregular profile that encompasses an entirety of the building 150.

The geofence 210 may be defined in various ways. In one exemplary implementation, the geofence 210 may be defined by a perimeter surrounding the entire building 150 or a portion of the building 150. The perimeter may be defined without taking into consideration an architecture of the building 150 and/or of various objects near the building 150 (adjacent buildings, walls, vegetation etc.).

In another exemplary implementation, the geofence 210 may be defined by using a set of global positioning system (GPS) coordinates. For example, the circular perimeter of the geofence 210 may be defined by using a pair of GPS coordinates for a center of the circular perimeter and by a radial distance parameter that originates from the center of the circular perimeter. As another example, the geofence 210 may be defined by GPS coordinates of various features of the building 150 such as corners and protrusions, or of elements that are present near the building 150 (such as, a mailbox, a curbside monument, or a driveway).

In yet another exemplary implementation, the geofence 210 may be defined by the vehicle security computer 110 using information provided by an individual such as a driver 111 of the vehicle 105. For example, the driver 111 may use a personal device 215 (a smartphone, a laptop computer, a tablet, etc.) to provide details about the building 150 and/or of structures near the building 150 (such as, for example, a wall, a fence, and/or another building). The driver 111 may also provide details such as, for example, a demarcation of a perimeter of the building 150, of vegetation that may partially obscure a view of the building 150, and/or of a lake or a pond located near the building 150 that may act as a natural security barrier).

As another example, the driver 111 may use the personal device 215 to provide to the vehicle security computer 110, information in the form of a photograph, an image, a graphical rendering, and/or documentation that the vehicle security computer 110 may process in order to define the geofence 210. Such information may also be provided to the vehicle security computer 110, by a server computer (not shown) that can wirelessly communicate with the vehicle security computer 110.

When defining the geofence 210, the vehicle security computer 110 may take into consideration objects that may assist in providing security to the building 150 (for example, a wall, a fence, a creek etc.) and can define the geofence 210 in a manner that takes advantage of such objects. The vehicle security computer 110 may also take into consideration certain other objects that may render the building 150 vulnerable to a security threat. For example, a low-height structure that abuts the building 150 may provide an entry point for a burglar to access an upper room window in the building 150 and may render the building 150 vulnerable to a security threat. The vehicle security computer 110 may define the geofence 210 to explicitly encompass areas around such objects that render the building 150 vulnerable to a security threat.

The vehicle security computer 110 may further define the geofence 210 based on the type of equipment available in the vehicle 105 to protect the building 150. In one example case, the geofence 210 may be defined by taking into consideration that the vehicle 105 is equipped with ultrasonic sensors. The ultrasonic sensors may be used to detect an intruder by detecting a change in a distance measurement between the vehicle 105 and a fixed object such as, for example, a gate, a door, or a wall of a building. The change in the distance measurement can occur when, for an example, an intruder moves into a measurement path of the ultrasonic sensor and the distance measurement now indicates a distance between the vehicle 105 and the intruder rather than between the vehicle 105 and the fixed object. Ultrasonic sensors operate independent of light and can therefore be used day or night for detection purposes. In some cases, an ultrasonic sensor may be coupled to a video camera, a digital camera, or an infra-red camera that is provided in the vehicle 105, for capturing images of the intruder when the ultrasonic sensor detects the intruder by using the change in distance measurement technique.

The geofence 210 may be further defined to include at least a portion of the building 150 or a surrounding area that can be monitored by a device in the vehicle 105 when the vehicle 105 approaches the building 150. For example, the geofence 210 may be defined to encompass a portion of a driveway in front of the building 150 that is visible to the image capture system 120 in the vehicle 105 when the vehicle 105 approaches the building 150. The vehicle security computer 110 may use images provided by the image capture system 120 to determine an entry of the vehicle 105 into the driveway and into the geofence 210. The vehicle security computer 110 may then execute a building security procedure in response to entering the geofence 210. In one case, the building security procedure may be automatically initiated when the driver 111 exits the vehicle 105 and locks the doors of the vehicle 105. In another case, the building security procedure may be manually initiated by the driver 111 depressing a button on a key fob. The button can be explicitly dedicated for the purpose of activating the building security procedure.

A dashed line 205 around the vehicle 105 indicates an extent of coverage provided by certain elements of the vehicle security computer 110, such as an extent of coverage provided by a glass break sensor in the vehicle 105. Some other elements of vehicle security computer 110, such as the image capture system 120 and/or the image capture system 125 can provide coverage that extends beyond the dashed line 205. The dashed line 205 may be interpreted as indicating an area inside which the vehicle security computer 110 can utilize substantially all sensors and detection devices as elements of an anti-theft system for protecting the vehicle 105.

Figure 3:
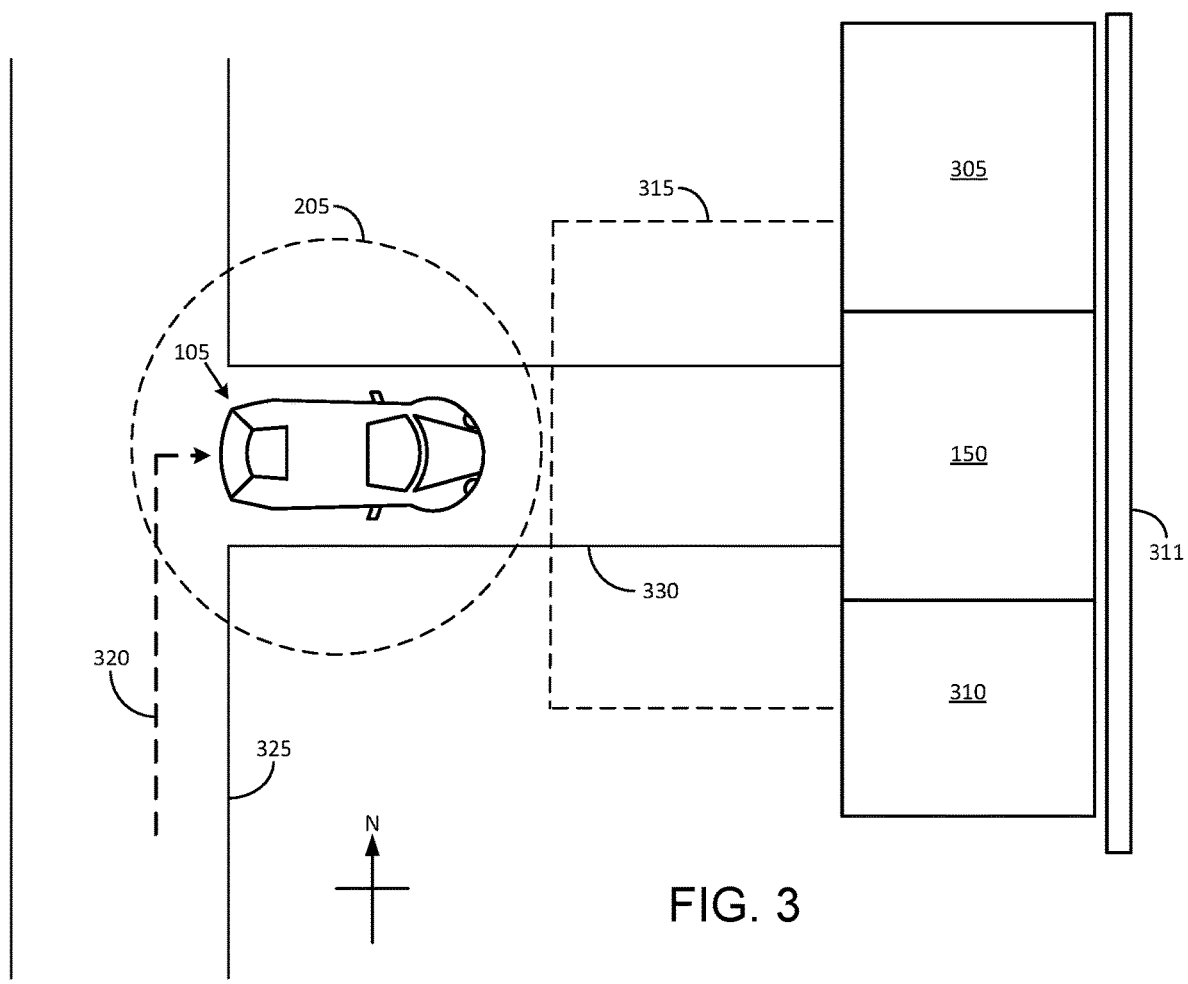
FIG. 3 illustrates a second exemplary geofence that may be used by a vehicle to provide home security in accordance with the disclosure.

FIG. 3 illustrates a second exemplary geofence 315 that may be provided around the building 150 in accordance with the disclosure. The geofence 315 may be used to configure the vehicle 105 to detect and provide warning of security events occurring outside the building 150. In this exemplary scenario, the building 150 is abutted by structures on either side, as well as behind the building 150. A building 305 abuts an entirety of a north side of the building 150, another building 310 abuts an entirety of a south side of the building 150, and a wall 311 extends along an entirety of an east side of the building 150. A driveway 330 extends from a front portion (west side) of the building 150 to a road 325. The geofence 315 may be defined as a rectangular area that encompasses the front portion of the building 150 and a section of the driveway 330, and taking advantage of the protection offered to the building 150 by the building 305, the building 310, and the wall 311.

In an exemplary scenario, the vehicle 105 has traveled north on the road 325 along a travel path 320, before turning east into the driveway 330. At this time, the extent of coverage provided by certain elements of the vehicle security computer 110 (indicated by the dashed line 205 around the vehicle 105) does not overlap the geofence 315. In accordance with the disclosure, at this moment in time, the vehicle security computer 110 may not provide security to the building 150.

Figure 4:
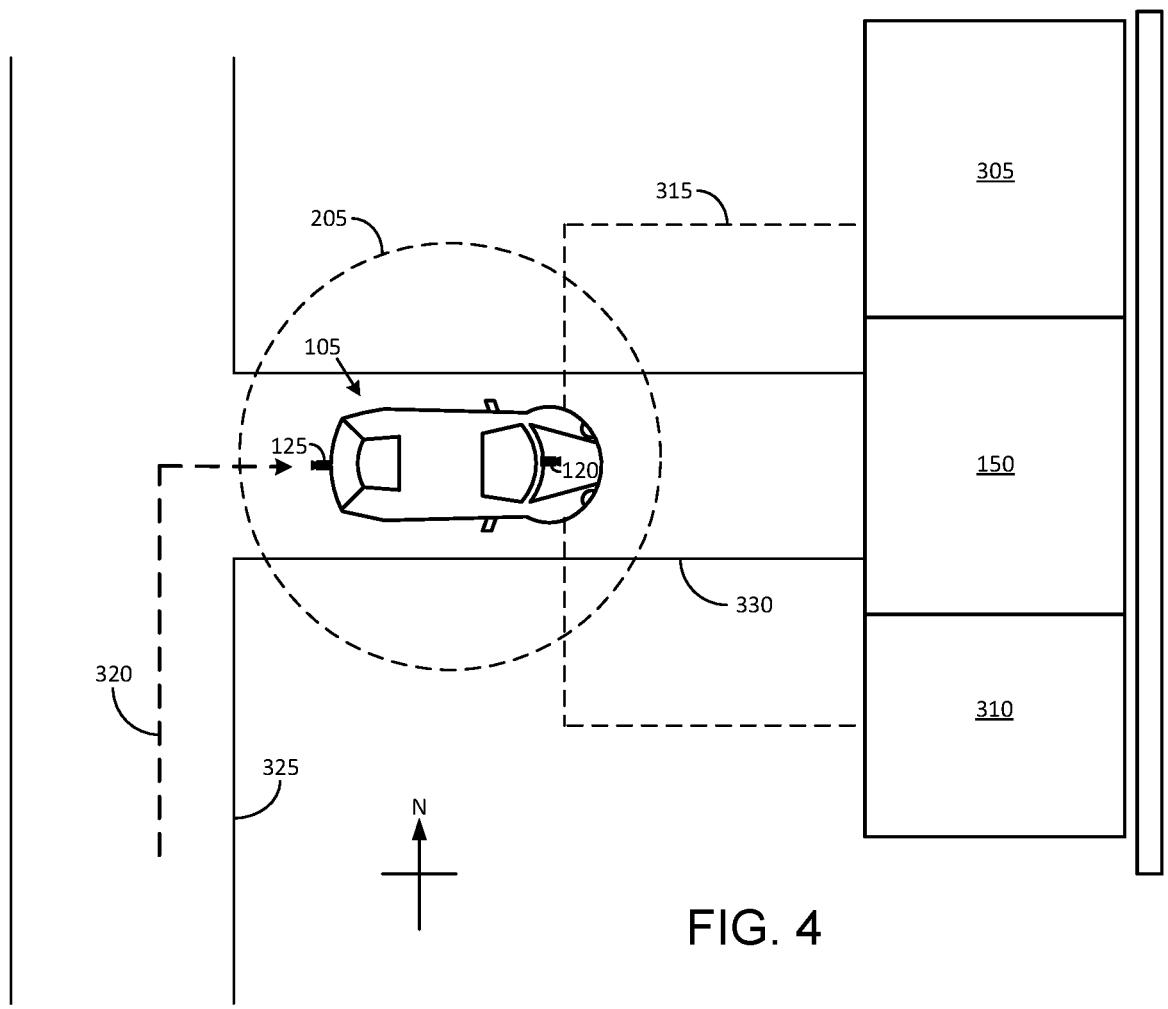
FIG. 4 shows a first exemplary scenario when using a vehicle to provide home security in accordance with the disclosure.

FIG. 4 shows an exemplary situation wherein the vehicle 105 is located in a position to provide security to the building 150 in accordance with the disclosure. The vehicle has now moved further up the driveway 330 than what is illustrated in FIG. 3. The extent of coverage provided by certain elements of the vehicle security computer 110 (indicated by the dashed line 205 around the vehicle 105) now overlaps the geofence 315. For example, an ultrasonic sensor present in the vehicle 105 may be at a distance that permits the ultrasonic sensor to detect sounds emanating from the front portion of the building 150 as well as from other locations inside the geofence 315 such as from a front portion of the building 305 or a front portion of the building 310. A front end of the vehicle 105 is facing the building 150 and the image capture system 120 inside the vehicle 105 may be used to capture images of the building 150 and objects located inside the geofence 315. However, the image capture system 125 in the vehicle 105 is facing away from the building 150 and cannot be used to effectively capture images of the building 150. In this scenario, the vehicle security computer 110 may be configured to use the image capture system 120 to provide security to the building 150 and may opt to forgo use of the image capture system 125.

Figure 5:
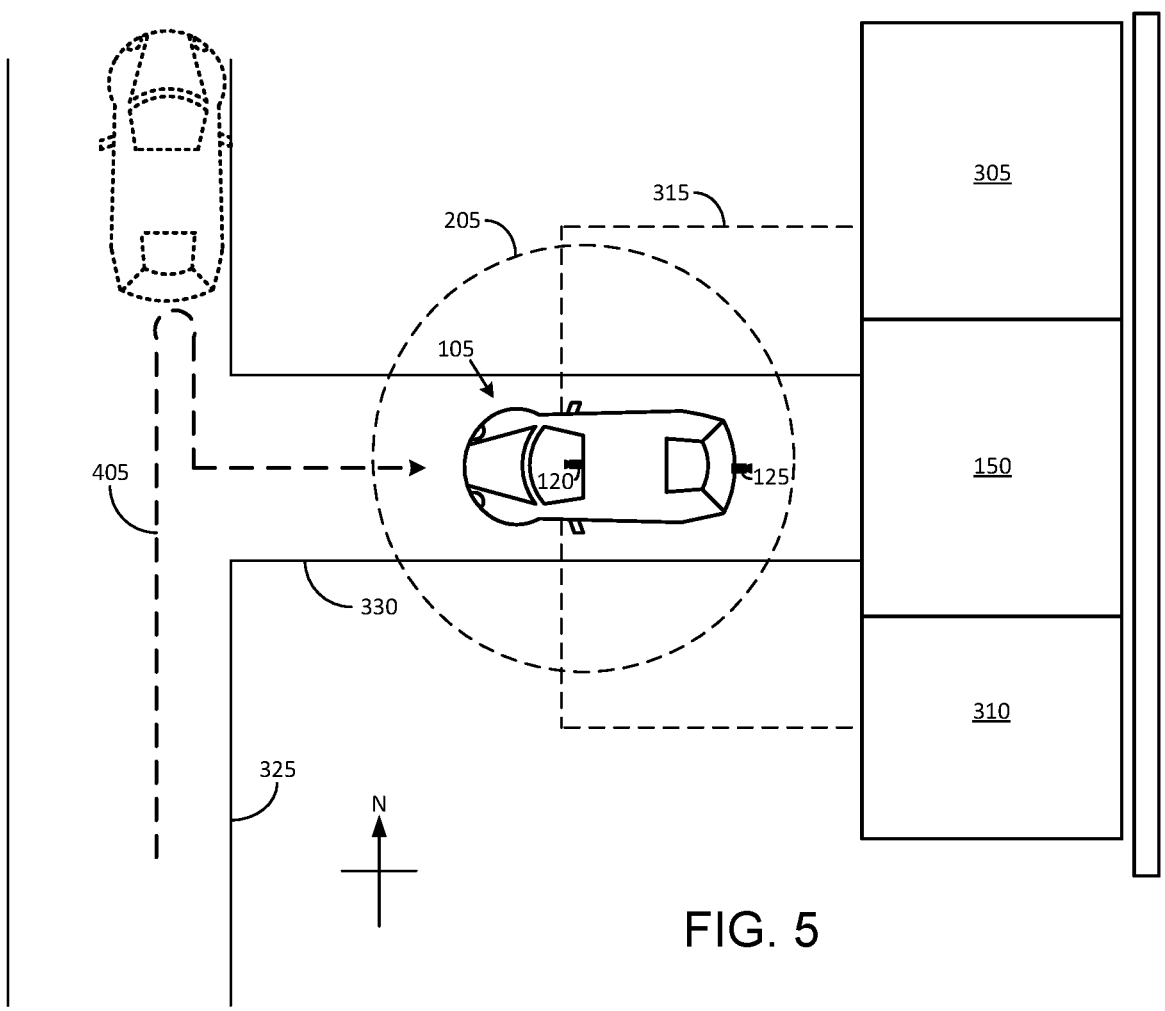
FIG. 5 shows a second exemplary scenario when using a vehicle to provide home security in accordance with the disclosure.

FIG. 5 shows another exemplary situation wherein the vehicle 105 is located in a position to provide security to the building 150 in accordance with the disclosure. In this exemplary situation, the vehicle has traveled north along the road 325 before reversing into the driveway 330 (as indicated by the travel path 405). A rear end of the vehicle 105 is now facing the building 150 in this scenario. In this scenario, the vehicle security computer 110 may be configured to use the image capture system 125 to provide security to the building 150 and may opt to forgo use of the image capture system 120.

The orientation of the vehicle 105 with respect to the building 150 may be detected by the vehicle security computer 110 in order to determine which of several devices (such as the image capture system 120 or the image capture system 125) may be used by the vehicle security computer 110. In an exemplary embodiment, the vehicle security computer 110 may detect the orientation of the vehicle 105 by using a dead reckoning procedure. The dead reckoning procedure may involve the vehicle security computer 110 evaluating data received from a global positioning system (GPS) apparatus in the vehicle 105 or from other sources. A few examples of such other sources can include an in-vehicle compass, a mobile phone compass, and/or a mobile phone configured to carry out a dead reckoning measurement. The GPS apparatus can include multiple devices configured to offer redundancy.

Figure 6:
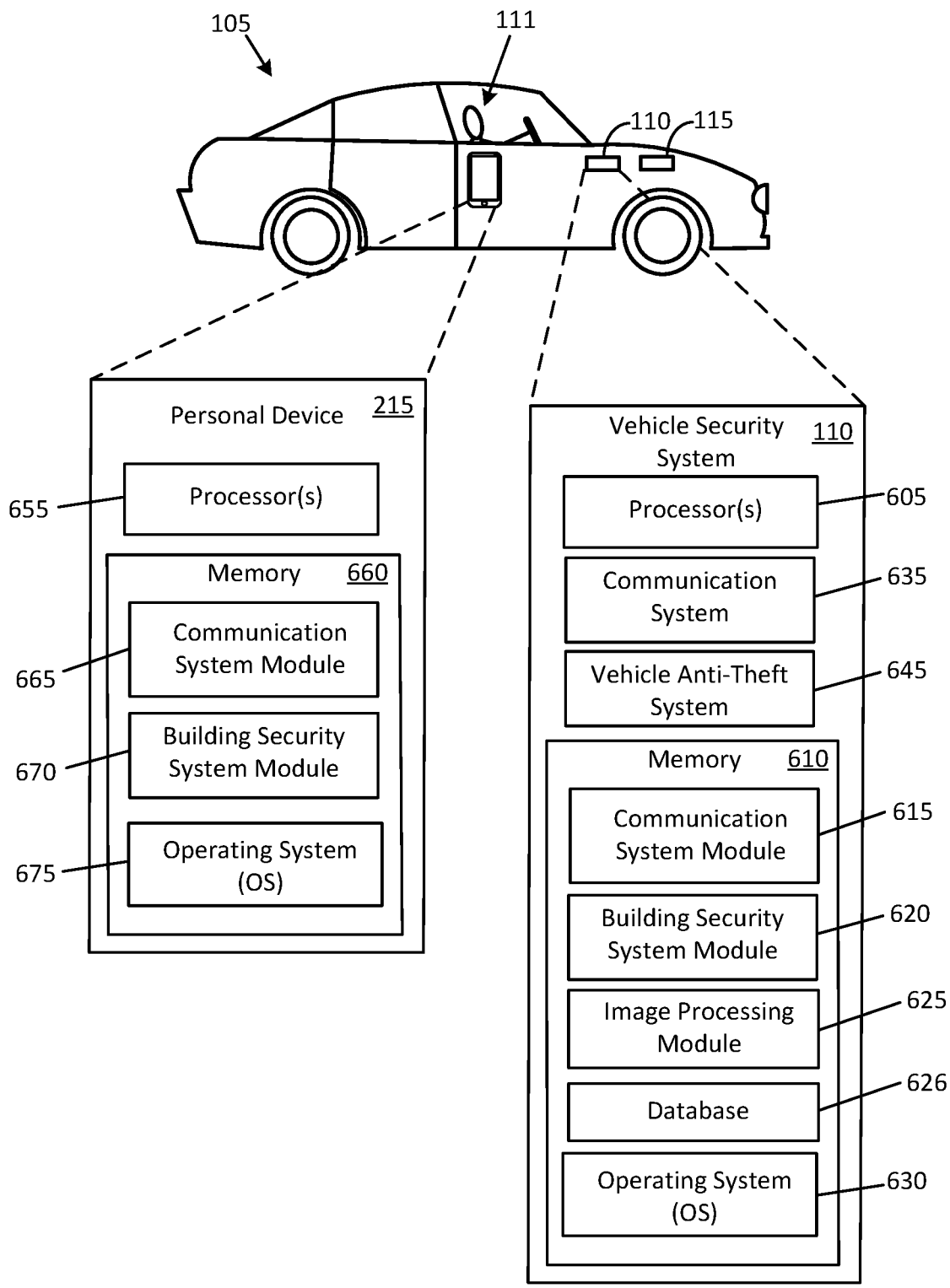
FIG. 6 shows some exemplary components of a computer that may be used in a vehicle to provide home security in accordance with the disclosure.

FIG. 6 shows some exemplary components that may be included in the vehicle security computer 110 and the personal device 215. The vehicle security computer 110 may include a processor 605, a communication system 635, a vehicle anti-theft system 645, and a memory 610. The communication system 635 can include a wireless transceiver that allows the vehicle security computer 110 to communicate with various devices such as a server computer (not shown) or the personal device 215 (for example, to display security-related information to the driver 111). The wireless transceiver may use any of various communication formats such as, for example, a vehicle-to-everything (V2X) communication format, an Internet communications format, or a cellular communications format for communicating with the server computer. The communication system 635 may also include circuitry for receiving information (signals, images etc.) from various devices in the vehicle 105, such as, for example, a motion sensor, a camera, and/or a GPS apparatus.

The vehicle anti-theft system 645 cooperates with various sensors and other elements to protect the vehicle 105 against malicious activities such as break-ins and theft. In some implementations, the vehicle anti-theft system 645 can be omitted from the vehicle security computer 110 and incorporated into the vehicle systems controller 115. The memory 610, which is one example of a non-transitory computer-readable medium, may be used to store an operating system (OS) 630, a database 626, and code modules such as a communication system module 615, a building security system module 620, and an image processing module 625. The code modules are provided in the form of computer-executable instructions that can be executed by the processor 605 for performing various operations in accordance with the disclosure.

The communication system module 615 may include computer-executable instructions for allowing the building security system module 620 to communicate with various elements such as a sensor, a camera, and/or a GPS apparatus. The communication may be carried out by using the communication system 635.

The building security system module 620 can enable the vehicle security computer 110 to carry out various actions to protect the building 150. Some exemplary actions may include defining a geofence such as the geofence 315 (referred to henceforth as one example), determining that the vehicle 105 has entered the geofence 315, and activating a building security procedure upon detecting entry of the vehicle 105 into the geofence 315.

In one exemplary implementation, the building security system module 620 is configured to launch the building security procedure automatically upon receiving an indication from a sensor, an image capture system, or the GPS apparatus, that the vehicle 105 has entered the geofence 315 of the building 150. For example, the building security system module 620 may receive, in real time, from a GPS apparatus in the vehicle 105, location information of the vehicle 105. The location information may be compared against GPS coordinates of the geofence 315 that can be stored in the database 626. The building security procedure may be automatically launched when the comparison indicates that the vehicle 105 has entered, or is located inside, the geofence 315. The building security procedure may be automatically deactivated when the vehicle 105 moves out of the geofence 315.

In another exemplary implementation, the building security system module 620 may provide to the driver 111 of the vehicle 105 an indication that the vehicle 105 is near the building 150 and that the building security procedure is ready for launch. The driver 111 may then choose to execute the building security procedure at a time of his/her own preference. The indication may be provided to the driver 111 in the form of a visual display, such as a message prompt or a graphical user interface (GUI) display on the personal device 215 of the driver 111.

In some embodiments, the building security system module 620 may utilize the image processing module 625 to process images that are provided to the vehicle security computer 110 by an image capture system in the vehicle 105 (such as the image capture system 120 or the image capture system 125). The processing may be directed at detecting security events such as an intruder present inside the geofence 315 and/or attempting to climb through a window of the building 150. The database 626 may be used to store reference images, such as a front view of the building 150, that may be used to compare against an image captured by the image capture system 120 (for example) when the vehicle 105 is entering the geofence 315, or is parked inside the geofence 315. The building security system module 620 may transmit a security alert to the driver 111, the vehicle systems controller 115, and/or a monitoring service, when a security event is detected by image processing module 625. The building security system module 620 may also send a signal to the vehicle systems controller 115 for instructing the vehicle systems controller 115 to activate an alarm, such as sounding of a car horn or flashing lights.

In some other embodiments, the building security system module 620 may process sound signals provided to the vehicle security computer 110 by sound sensors in the vehicle 105. The sound sensors may detect sounds emanating from not only inside the geofence 315 but from other parts of the building 150 as well. The building security system module 620 may process such anomalies to identify a security event and to transmit a security alert to the driver 111, the vehicle systems controller 115, and/or a monitoring service, for example.

The personal device 215 may include a processor 655 and a memory 660. The memory 660, which is another example of a non-transitory computer-readable medium, may be used to store an operating system (OS) 675 and code modules such as a communication system module 665 and a building security system module 670. The code modules are provided in the form of computer-executable instructions that can be executed by the processor 655 for performing various operations in accordance with the disclosure.

The communication system module 665 may allow the personal device 215 to communicate with the communication system 635 of the vehicle security computer 110. The building security system module 620 may include computer-executable instructions for enabling the personal device 215 to interact with the vehicle security computer 110 for various purposes such as to receive alerts when the vehicle security computer 110 detects a security event. In one exemplary implementation, the building security system module 620 may be provided in the form of a software application that is loaded into the personal device 215. The driver 111 may do so, for example, by downloading the application from a website.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 610 and the memory 660, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    detecting, by a computer, entry of a vehicle into a geofence of a building; and
    activating, by the computer, a building security procedure upon detecting the entry of the vehicle into the geofence, the building security procedure comprising:
        generating a security alert upon detecting a security event inside the geofence; and
        transmitting the security alert to a recipient entity;
    determining, by the computer, an orientation of the vehicle with respect to the building; and
    configuring a detection mode of operation of a first sensor in the vehicle based on the orientation of the vehicle with respect to the building.

2. The method of claim 1, wherein the building is a residence of an individual, and wherein the recipient entity is a security system located inside the residence or a personal device of the individual.

3. The method of claim 2, wherein the geofence is defined by information provided to the computer by the individual.

4. The method of claim 1, wherein determining the orientation of the vehicle with respect to the building comprises the computer receiving orientation information from a global positioning system (GPS) apparatus in the vehicle or a compass system in the vehicle.

5. The method of claim 1, wherein the first sensor is an imaging device, and wherein configuring the detection mode of operation of the imaging device comprises orienting the image device in a first direction with respect to the building.

6. The method of claim 1, wherein the security event comprises an intruder approaching the building and the first sensor is one of a motion sensor, a presence detector, or an imaging device configured to detect the intruder approaching the building.

7. The method of claim 1, wherein detecting the entry of the vehicle into the geofence comprises the computer receiving information from a global positioning system (GPS) apparatus provided in the vehicle.

8. A method comprising:
   executing, by a computer, a building security procedure when a vehicle is located inside a geofence of a building, the building security procedure comprising:
      generating a security alert upon detecting a security event outside the building; and
      transmitting the security alert to a recipient entity;
   determining, by the computer, an orientation of the vehicle with respect to the building; and
   configuring a detection mode of operation of a first sensor in the vehicle based on the orientation of the vehicle with respect to the building.

9. The method of claim 8, further comprising:
   activating, by the computer, the building security procedure upon detecting an entry of the vehicle into the geofence; and
   deactivating, by the computer, the building security procedure upon detecting an exit of the vehicle from the geofence.

10. The method of claim 8, wherein determining the orientation of the vehicle with respect to the building comprises the computer applying a dead reckoning procedure upon data received from a global positioning system (GPS) apparatus in the vehicle.

11. The method of claim 8, wherein the first sensor is an imaging device, and wherein configuring the detection mode of operation of the imaging device comprises orienting the image device in a first direction with respect to the building.

12. The method of claim 8, wherein the security event comprises an intruder approaching the building and the first sensor is one of a motion sensor, a presence detector, or an imaging device configured to detect the intruder approaching the building.

13. A computer provided in a vehicle, comprising:
   a memory that stores computer-executable instructions; and
   a processor configured to access the memory and execute the computer-executable instructions to at least:
      initiate a building security procedure when the vehicle is located inside a geofence of a building;
      generate a security alert upon detecting a security event outside the building;
      transmit the security alert to a recipient entity;
      activate the building security procedure upon detecting an entry of the vehicle into the geofence;
      deactivate the building security procedure upon detecting an exit of the vehicle from the geofence;
      determine an orientation of the vehicle with respect to the building; and
      configure a detection mode of operation of a first sensor in the vehicle based on the orientation of the vehicle with respect to the building.

14. The computer of claim 13, wherein the building is a residence of an individual, and wherein the recipient entity is a security system located in the residence or a smartphone of the individual.

15. The computer of claim 13, wherein the processor is further configured to access the memory and execute computer-executable instructions to:
   apply a dead reckoning procedure upon data received from a global positioning system (GPS) apparatus in the vehicle for determining the orientation of the vehicle with respect to the building.

16. The computer of claim 15, wherein the first sensor is an imaging device, and wherein the processor is further configured to access the memory and execute computer-executable instructions to:
   orient the image device in a first direction with respect to the building after determining the orientation of the vehicle with respect to the building.

* * * * *